United States Patent
Wu

(10) Patent No.: US 8,744,445 B2
(45) Date of Patent: Jun. 3, 2014

(54) METHOD OF HANDLING HANDOVER MESSAGE DECODING AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 439 days.

(21) Appl. No.: 12/770,751

(22) Filed: Apr. 30, 2010

(65) Prior Publication Data

US 2010/0290429 A1 Nov. 18, 2010

Related U.S. Application Data

(60) Provisional application No. 61/177,658, filed on May 13, 2009, provisional application No. 61/187,283, filed on Jun. 16, 2009.

(51) Int. Cl.
*H04W 4/00* (2009.01)

(52) U.S. Cl.
USPC .......................................... 455/436; 370/331

(58) Field of Classification Search
USPC .......................................... 455/436; 370/331
See application file for complete search history.

(56) References Cited

U.S. PATENT DOCUMENTS

2009/0131053 A1* 5/2009 Sachs et al. ................... 455/436

OTHER PUBLICATIONS

3GPP TS 25/331 V8.0.0 (Sep. 2007).*
3GPP TS 25.331 V8.6.0, "Radio Resource Control (RRC)," Mar. 2009.
3GPP TS 36.331 V8.5.0, "Evolved Universal Terrestrial Radio Access (E-UTRA) Radio Resource Control (RRC)," Mar. 2009.
European patent application No. 10005083.0, European application filing date: May 14, 2010, European Search Report mailing date: Jan. 27, 2011.
Office action mailed on Feb. 24, 2011 for the European application No. 10005083.0, filing date May 14, 2010, p. 1-8.
3GPP TS 25.331 V8.4.0 (Sep. 2008), "3rd Generation Partnership Project; Technical Specification Group Radio Access Network; Radio Resource Control (RRC); Protocol Specification, (Release 8)", XP050368024, pp. 1-1543.
Nokia Corporation, Nokia Siemens Networks, "Introduction of SR-VCC operations", 3GPP TSG-RAN-WG2 Meeting #65, R2-091140, Feb. 9-13, 2009, pp. 1-23, Athens, Greece, XP050322851.
Ericsson, "Missing reference to E-UTRAN DL-DCCH-Message at Inter-RAT Handover", 3GPP TSG-RAN WG2 #65, R2-091725, Feb. 9-13, 2009, Athens, Greece, XP050322792.
HTC Corporation, "Clarification on signalling connection establishment after Inter-RAT HO to UTRAN", 3GPP TSG-RAN2 Meeting #66, R2-093212, May 4-8, 2009, San Francisco, USA, XP050340916.

(Continued)

*Primary Examiner* — Nizar Sivji
(74) *Attorney, Agent, or Firm* — Winston Hsu; Scott Margo

(57) ABSTRACT

A method of handling handover message decoding for a mobile device in a wireless communication system is disclosed. The method includes via a first radio access technology (RAT), receiving a handover message associated with a handover from the first RAT to a second RAT supporting services of a packet switched (PS) domain and a circuit switched (CS) domain, wherein the handover message comprises type information and an inter-RAT message generated based on the second RAT, and determining a switched domain type of the inter-RAT message according to the type information.

8 Claims, 7 Drawing Sheets

(56) References Cited

OTHER PUBLICATIONS

3GPP TS 23.216 V8.3.0 (Mar. 2009), "3rd Generation Partnership Project; Technical Specification Group Services and System Aspects; Single Radio Voice Call Continuity (SRVCC); Stage 2 (Release 8)", XP002597914, pp. 1-33.

HTC Corporation, "Summary of [65b-4] Email discussion on Handover from E-UTRA to UTRA", 3GPP TSG-RAN WG2 #66, R2-093213, May 4-8, 2009, San Francisco, USA, XP002597915, pp. 1-5.

HTC Corporation, "Clarification on signalling connection establishment after HO from E-UTRAN", 3GPP TSG-RAN2 Meeting #65bis, R2-092366, Mar. 23-27, 2009, Seoul, Korea, XP050340102.

HTC Corporation, "Clarification on handover to GERAN from E-UTRAN", 3GPP TSG-RAN WG2 #66bis, R2-093986, Jun. 29-Jul. 3, 2009, Los Angeles, USA, XP050352161, pp. 1-4.

"Universal Mobile Telecommunications System(UMTS); Radio Resource Control (RRC); Protocol specification", 3GPP TS 25.331 version 8.0.0 Release 8, Oct. 23, 2007, p. 220-231.

* cited by examiner

METHOD OF HANDLING HANDOVER MESSAGE DECODING AND RELATED COMMUNICATION DEVICE

CROSS REFERENCE TO RELATED APPLICATIONS

This application claims the benefit of U.S. Provisional Application No. 61/177,658, filed on May 13, 2009 and entitled "Scheme to handle Inter-RAT handover in wireless communications system" and U.S. Provisional Application No. 61/187,283, filed on Jun. 16, 2009 and entitled "Scheme to handle Inter-RAT handover in wireless communications system", the contents of which are incorporated herein in their entirety.

BACKGROUND OF THE INVENTION

1. Field of the Invention

A method and related communication device for a wireless communication system is disclosed, and more particularly to, a method and related communication device for handling message decoding associated with a handover in a wireless communication system.

2. Description of the Prior Art

A handover procedure can transfer a mobile device from a communication state to another communication state. The communication state change can correspond to a telecommunication system, a cell, or a frequency layer scale, and corresponding handover is known as an inter-radio access technology (RAT), an inter/intra-cell or an inter-frequency handover.

For the inter-RAT handover, an X RAT can use an X handover procedure to hand over a mobile device, known as UE (User Equipment) or MS (Mobile Station), to a Y RAT by sending an X handover message including Y RAT configuration information. The mobile device configures itself to fit system requirements of the Y RAT according to the received Y RAT configuration information. Mostly, the Y RAT configuration information is formed as a message conforming to the specification of the Y RAT and includes mobility management, signaling connection, security, and capability information. Common RATs include UMTS (Universal Mobile Telecommunications System), GSM (Global System for Mobile communications)/GPRS (General Packet Radio Service), GERAN (GSM/EDEG radio access network) Iu mode system, CDMA (Code Division Multiple Access) 2000, and LTE (Long Term Evolution) systems.

HANDOVER COMMAND, PS (Packet-Switched) HANDOVER COMMAND and DTM (DUAL TRANSFER MODE) HANDOVER COMMAND messages are provided to initiate an inter-RAT handover to the GSM/GPRS mode system for CS (Circuit-Switched) or PS type connection transfer. The HANDOVER COMMAND message is a GSM RR (Radio Resource) message seen as a CS-type message, and the PS HANDOVER COMMAND and DTM HANDOVER COMMAND messages are GPRS (General Packet Radio Service) RLC/MAC (Radio Link Control/Medium Access Control) control messages seen as PS-type messages. The UE is equipped with a GSM RR message decoder for decoding the HANDOVER COMMAND message and a GPRS RLC/MAC control message decoder for decoding the PS HANDOVER COMMAND and DTM HANDOVER COMMAND messages.

For the inter-RAT handover from the UMTS to the GSM/GPRS system, a HANDOVER FROM UTRAN COMMAND message for initiating the inter-RAT handover can include one of the HANDOVER COMMAND, PS HANDOVER COMMAND and DTM HANDOVER COMMAND messages. A UE with CS and PS services in a UTRAN (UMTS Terrestrial Radio Access Network) receives a HANDOVER FROM UTRAN COMMAND message when a handover attempt for the UE is made by the UTRAN. However, the UE cannot know which GSM message is included in the received HANDOVER FROM UTRAN COMMAND message. Since the UE has no way to know a switched type (the CS or PS type) of the GSM message, errors in decoding the GSM message occur if the UE uses a wrong decoder. For example, if the UE uses the GSM RR message decoder to decode a GPRS RLC/MAC control message, the decoding error occurs. In this situation, the UE determines that the HANDOVER FROM UTRAN COMMAND message is invalid and then sends a HANDOVER FROM UTRAN FAILURE message to the UTRAN. Thus, lack of knowing the identity of the GSM message can cause the handover failure.

The inter-RAT handover from the LTE to the GSM/GPRS system has similar problem. When a UE in an E-UTRAN has a voice service (VoIP call) on going, the E-UTRAN can perform a PS handover to the GPRS/GERAN Iu mode system to continue the voice service or perform a SRVCC (Single Radio Voice Call Continuity) handover to the GSM/GERAN Iu mode system so that the UE can reuse the CS system. For initiation of the handover, the E-UTRAN sends to the UE a MobilityFromEUTRACommand message that may include either PS HANDOVER COMMAND or HANDOVER COMMAND message. However, the UE cannot know which of GSM or GPRS RLC/MAC message is included. The decoding errors can occur and thereby causes failure of the handover.

SUMMARY OF THE INVENTION

A method of handling message decoding associated with an inter-RAT handover in a wireless communication system is disclosed to avoid message decoding error and related handover failure.

A method of handling handover message decoding for a mobile device in a wireless communication system is disclosed. The method includes via a first radio access technology (RAT), receiving a handover message associated with a handover from the first RAT to a second RAT supporting services of a packet switched (PS) domain and a circuit switched (CS) domain, wherein the handover message comprises type information and an inter-RAT message generated based on the second RAT, and determining a switched domain type of the inter-RAT message according to the type information.

A method of providing handover message decoding information for a network device of a wireless communication system is disclosed. The method includes creating a handover message based on a first RAT, obtaining a inter-RAT message generated based on a second RAT supporting services of a PS domain and a CS domain, generating type information based on a switched domain type of the inter-RAT message, including the inter-RAT message and the type information in the handover message, and initiating a handover from the first RAT to the second RAT via the handover message for a mobile device of the wireless communication system.

A method of handling handover message decoding for a mobile device in a wireless communication system is disclosed. The method includes via a first RAT, receiving a handover message for a handover from the first RAT to a second RAT supporting service of a PS domain and a CS domain, wherein the handover message comprises an inter- RAT message generated based on the second RAT, and decoding the inter-RAT message with both a PS-type message decoder and a CS-type message decoder.

A method of handling handover message decoding for a mobile device in a wireless communication system is disclosed. The method includes via a first RAT, receiving a handover message for a handover from the first RAT to a second RAT supporting service of a PS domain and a CS domain, wherein the handover message comprises an inter-RAT message generated based on the second RAT, and determining a switched domain type of the inter-RAT message according to a size of the inter-RAT message.

A mobile device of a wireless communication system for handling handover message decoding is disclosed. The mobile device includes means for via a first RAT, receiving a handover message associated with a handover from the first RAT to a second RAT supporting services of a PS domain and a CS domain, wherein the handover message comprises type information and an inter-RAT message generated based on the second RAT, and means for determining a switched domain type of the inter-RAT message according to the type information.

A network device of a wireless communication system for providing handover message decoding information is disclosed. The network device includes means for creating a handover message based on a first RAT, means for obtaining a inter-RAT message generated based on a second RAT supporting services of a PS domain and a CS domain, means for generating type information based on a switched domain type of the inter-RAT message, means for including the inter-RAT message and the type information in the handover message, and means for initiating a handover from the first RAT to the second RAT via the handover message for a mobile device of the wireless communication system.

A mobile device of a wireless communication system for handling handover message decoding is disclosed. The mobile device includes means for via a first RAT, receiving a handover message for a handover from the first RAT to a second RAT supporting service of a PS domain and a CS domain, wherein the handover message comprises an inter-RAT message generated based on the second RAT, and means for decoding the inter-RAT message with both a PS-type message decoder and a CS-type message decoder.

A mobile device of a wireless communication system for handling handover message decoding is disclosed. The mobile device includes means for via a first RAT, receiving a handover message for a handover from the first RAT to a second RAT supporting service of a PS domain and a CS domain, wherein the handover message comprises an inter-RAT message generated based on the second RAT, and means for determining a switched domain type of the inter-RAT message according to a size of the inter-RAT message.

These and other objectives will no doubt become obvious to those of ordinary skill in the art after reading the following detailed description of the preferred example that is illustrated in the various figures and drawings.

DETAILED DESCRIPTION

Figure 1:
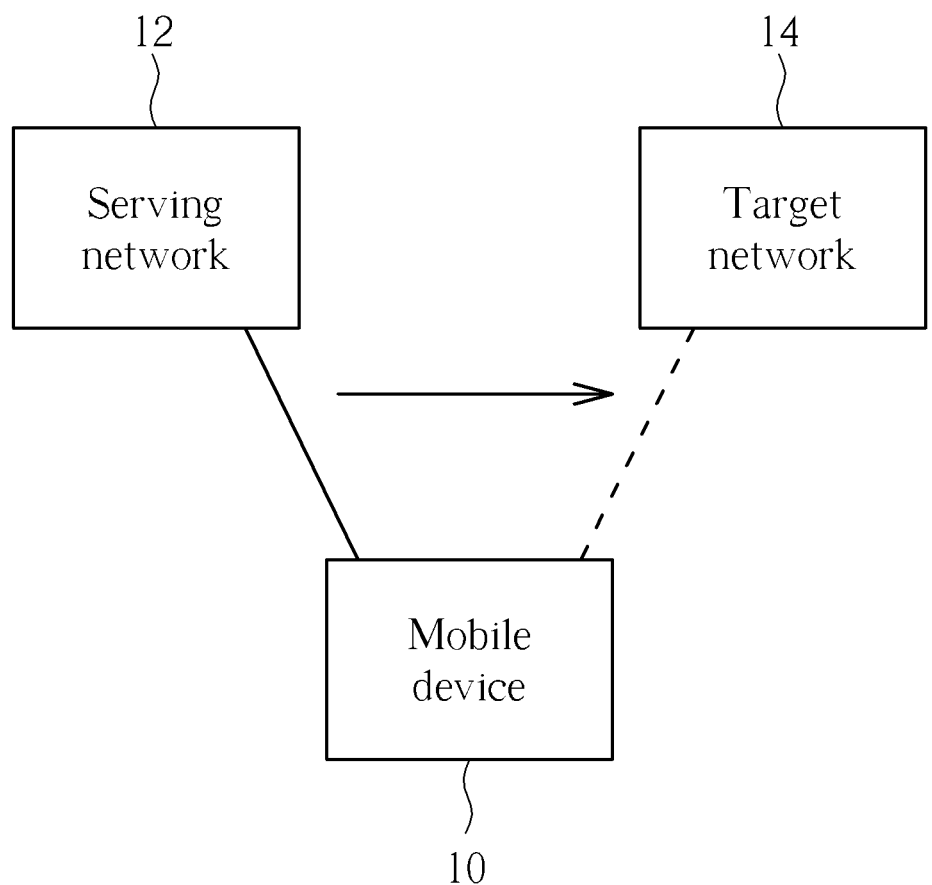
FIG. 1 is a schematic diagram of an exemplary handover behavior between two wireless communication systems.

Please refer to FIG. 1, which illustrates a schematic diagram of an exemplary handover behavior between two wireless communication systems. In FIG. 1, a serving network 12 and a target network 14 employ different radio access technologies (RATs), and a mobile device 10 supports both of the RATs and packet switched (PS) and circuit switched (CS) services. Either of the RATs can be a UMTS (Universal Mobile Telecommunications System) supporting both the PS and CS services, GSM (Global System for Mobile communications) supporting both the PS and CS services if a GPRS (General Packet Radio Service) function is included, GERAN (GSM/EDEG radio access network) Iu mode system supporting the CS and PS services, or LTE (long-term evolution) system that is a pure PS network. In the LTE system, the network (either the serving network 12 or the target network 14) is referred as a E-UTRAN (evolved UMTS Terrestrial Radio Access Network) comprising a plurality of eNBs (evolved Node-Bs); in the UMTS system, the network is referred as a UTRAN comprising a radio network controller (RNC) and a plurality of NBs (Node-Bs); In the GSM/GERAN Iu mode system, the network is referred as a GERAN (GSM/EDEG Radio Access Network) comprising a base station controller (BSC) and a plurality of base stations. This terminology will be used throughout the application for ease of reference, and however, this should not be construed as limiting the disclosure to any one particular type of network. The mobile device 10 is referred as a user equipment (UE) or a mobile station (MS) and can be a device such as a mobile phone, a computer system, etc.

In the FIG. 1, the mobile device 10 may have to perform a handover where the target network 14 supports services of CS and PS domains, and corresponding handover message received from the serving network 12 includes an inter-RAT message for the mobile device 10 to change it configuration to meet system requirements of the target network 14. The inter-RAT message is generated based on the RAT of the target network 14 and can be a PS or CS type message including mobility management, signaling connection, and security, which the mobile device 10 has to follow for accurately handing over to the target network.

For example, the serving network 12 when being the UTRAN can use a HANDOVER FROM UTRAN COMMAND message, as a handover message, to initiate an inter-RAT handover for the mobile device 10 to move out the UMTS system. The HANDOVER FROM UTRAN COMMAND message includes a "System type" information element (IE) indicating the type of the target network 14. The available types in the "System type" IE are "GSM", "GERAN Iu", "cdma 2000", and "E-UTRA" types. When the target network 14 is the "GSM" type, the serving network 12 can include one of HANDOVER COMMAND, PS HANDOVER COMMAND and DTM HANDOVER COMMAND messages, as the abovementioned inter-RAT messages generated based on the GSM/GPRS protocol. The HANDOVER COMMAND message is a GSM RR (Radio Resource) message seen as a CS-type RR message, and the PS HANDOVER COMMAND and DTM HANDOVER COMMAND messages are GPRS (General Packet Radio Service) RLC/MAC (Radio Link Control/Medium Access Control) control messages seen as PS-type RR messages.

Take another example, the serving network 12 when being the E-UTRAN can use a MobilityFromEUTRACommand message as a handover message, to initiate an inter-RAT handover for the mobile device 10 to move out the LTE system. Similarly, a targetRAT-MessageContainer IE of the MobilityFromEUTRACommand message is used to include one of the HANDOVER COMMAND, PS HANDOVER COMMAND and DTM HANDOVER COMMAND messages when the target network 14 is assigned to the GSM/GPRS system.

Figure 2:
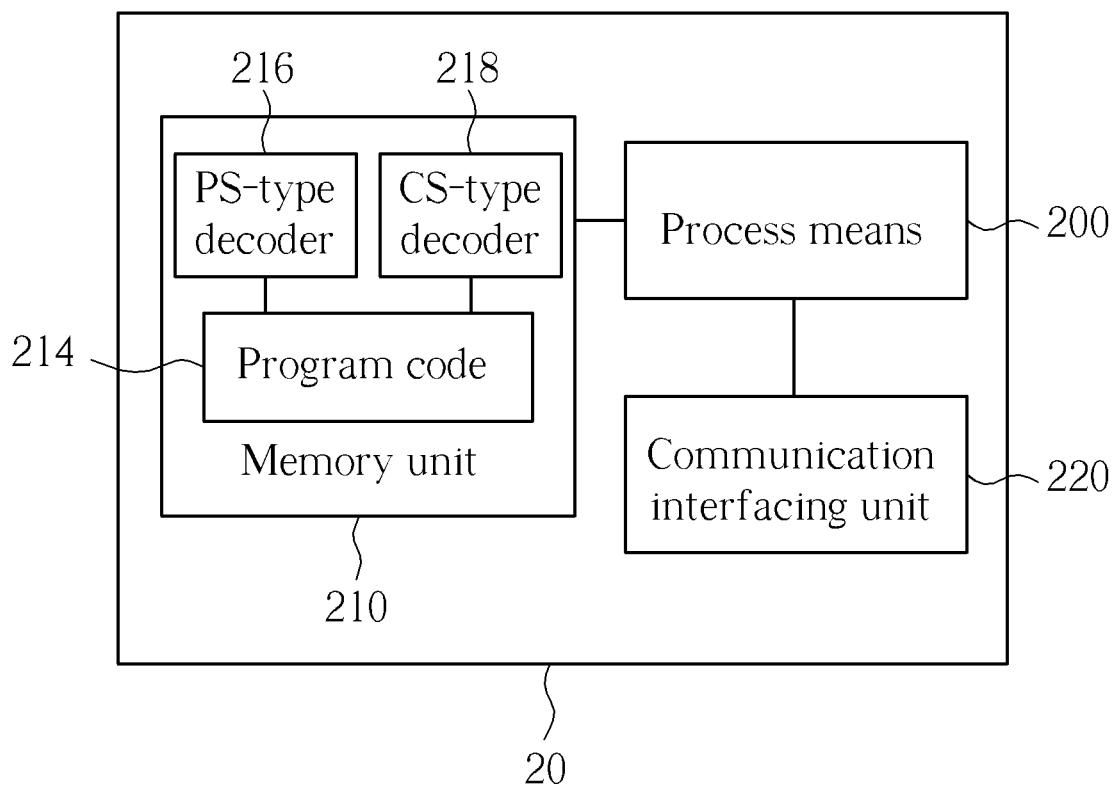
FIG. 2 is a schematic diagram of an exemplary communication device.

In the abovementioned situations, processes and related communication device for correctly decoding the inter-RAT message at the mobile device 10 side are provided as follows. Please refer to FIG. 2, which illustrates a schematic diagram of a communication device 20 according to an example. The communication device 20 may be the mobile device 10 or an entity of the serving network 12 shown in FIG. 1 and may include a processing means 200 such as a microprocessor or ASIC (Application Specific Integrated Circuit), a memory unit 210 and a communication interfacing unit 220. The memory unit 210 may be any data storage device that can store program code 214 including a PS-type decoder 216 and a CS-type decoder 218, for access by the processing means 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 may be preferably a radio transceiver and accordingly exchanges wireless signals according to processing results of the processing means 200.

Figure 3:
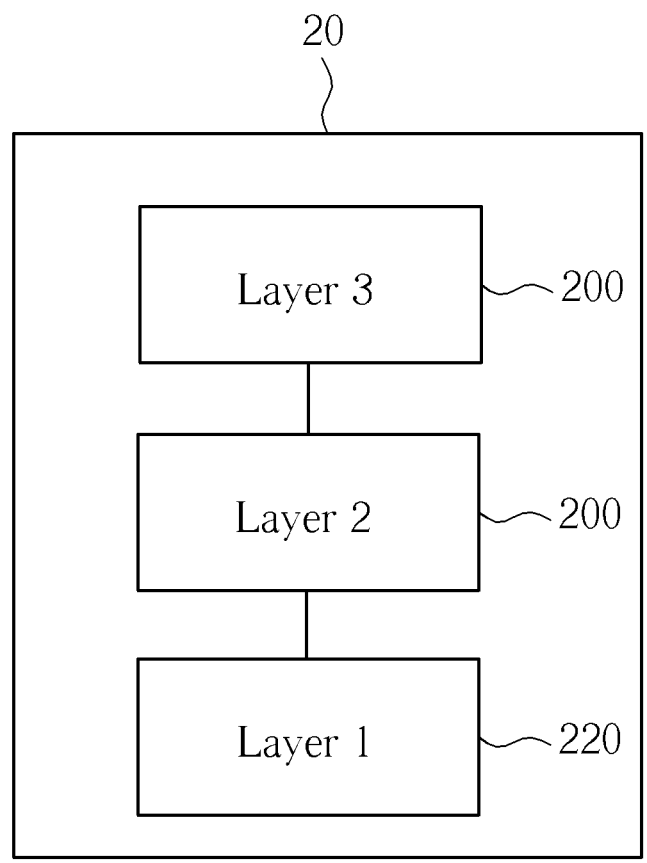
FIG. 3 is a flow chart of exemplary program code according to FIG. 2.

Please refer to FIG. 3, which illustrates a schematic diagram of the program code 214 according to an example. The program code 214 includes program code of multiple communications protocol layers, which are a Layer 3 300, a Layer 2 310, and a Layer 1 320. The Layer 3 300 includes a radio resource control (RRC) layer or a RR (Radio Resource) layer for handling RRC or RR messages and related IEs, such as the MobilityFromEUTRACommand and HANDOVER COMMAND, etc. The Layer 3 controls the PS-type decoder 216 and the CS-type decoder 218 to decode the inter-RAT messages included in the handover message based on the following processes. The Layer 2 310 includes a radio link control (RLC) layer and a medium access control layer. The Layer 1 includes a physical (PHY) layer. In GSM/GPRS system, the PS-type decoder 216 may be a GPRS RLC/MAC control message decoder for decoding the PS HANDOVER COMMAND and DTM HANDOVER COMMAND messages, and the CS-type decoder 218 may be a GSM RR message decoder for decoding the HANDOVER COMMAND message.

Figure 4:
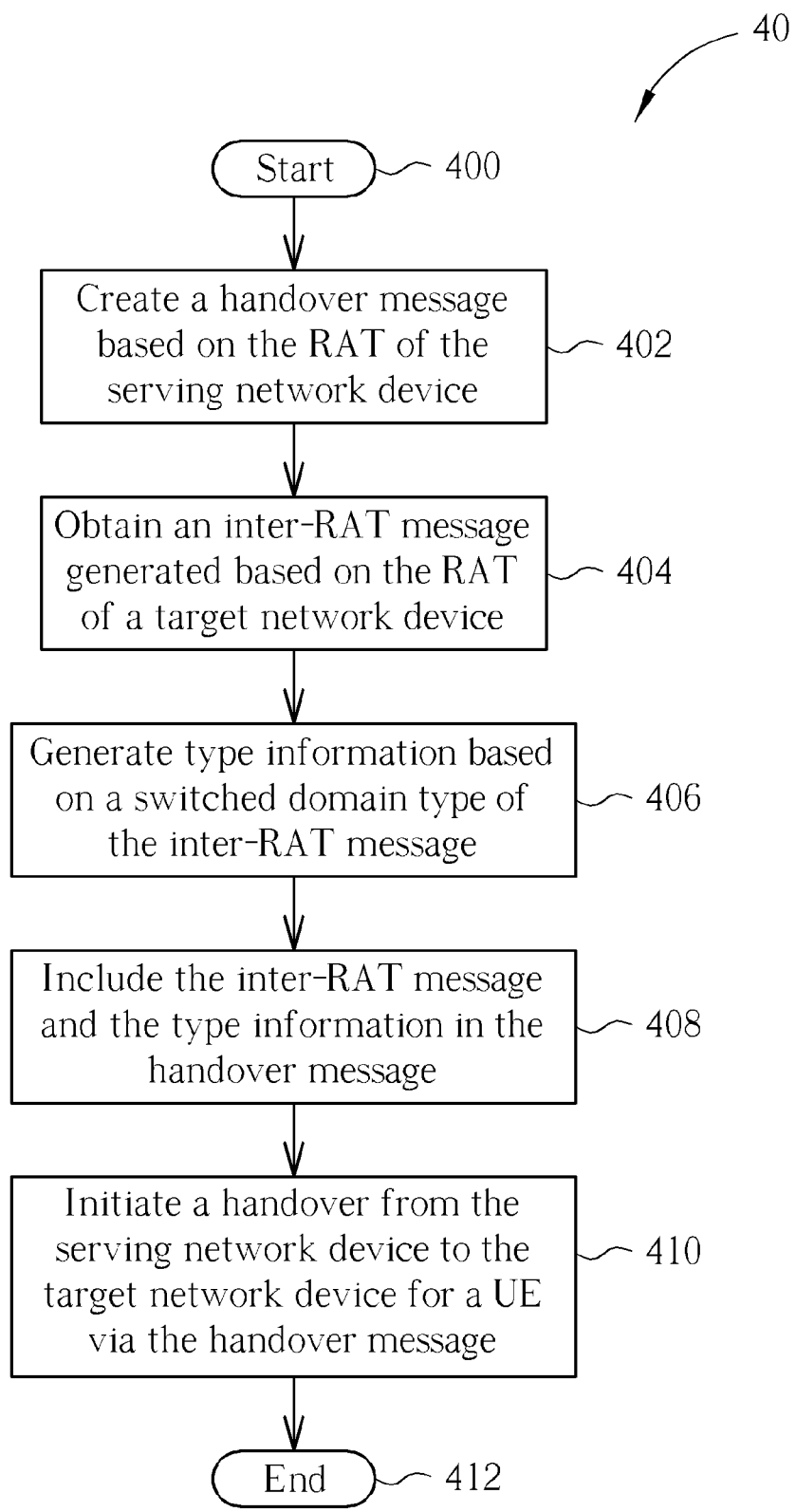
FIG. 4 is a flow chart of an exemplary handover process.

FIG. 4 illustrates a flow chart of an exemplary handover process 40. The handover process 40 is used for a serving network device (e.g. the serving network 12) of a wireless communication system for providing handover message decoding information. The handover process 40 can be compiled into the program code 214 and includes the following steps:

Step 400: Start.
Step 402: Create a handover message based on the RAT of the serving network device.
Step 404: Obtain an inter-RAT message generated based on the RAT of a target network device.
Step 406: Generate type information based on a switched domain type of the inter-RAT message.
Step 408: Include the inter-RAT message and the type information in the handover message.
Step 410: Initiate a handover from the serving network device to the target network device for a UE via the handover message.
Step 412: End.

According to the handover process 40, the serving network device sends the handover message including the type information and the inter-RAT message to the UE (e.g. the mobile device 10). The handover message based on the RAT of the serving network device is used for directing the UE from the serving network to the target network supporting both the CS and PS domains. The inter-RAT message generated based on the RAT of the target network device could be a PS-type or CS-type message. The serving network device obtains the inter-RAT message from the target network device and determines its switched domain type. The type information is used for indicating the switched domain type of the inter-RAT message to the UE.

Figure 5:
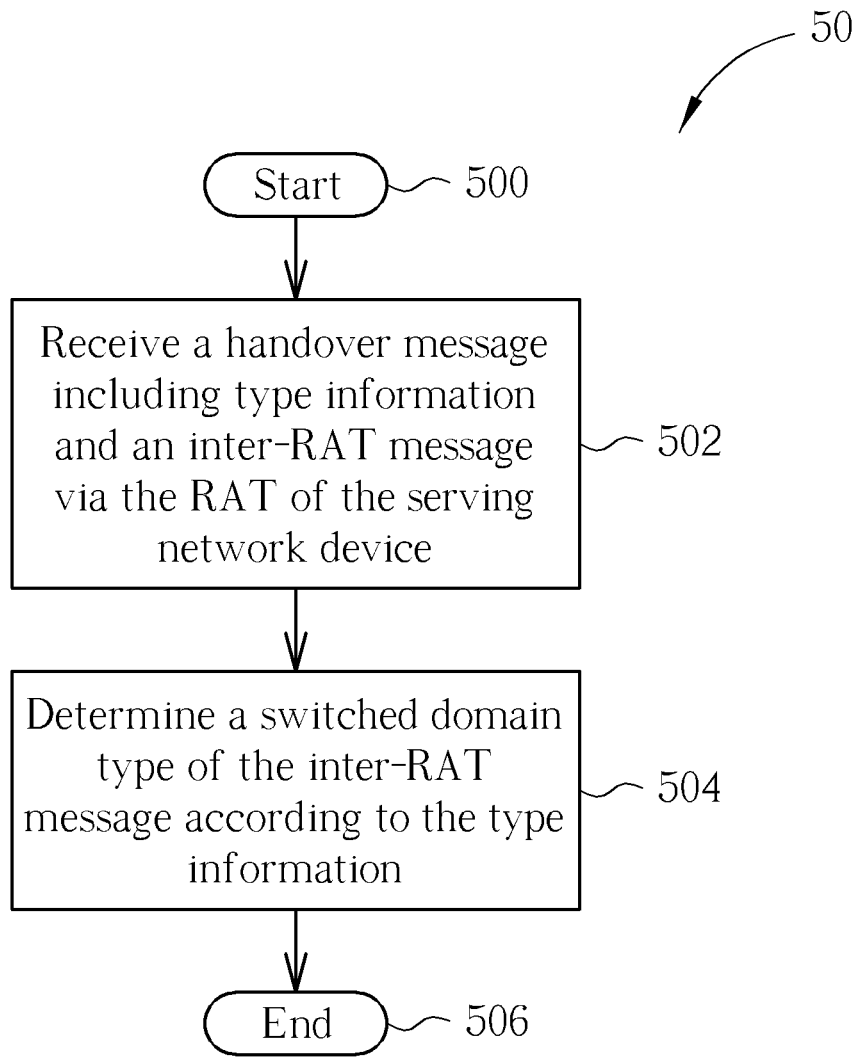
FIG. 5 is a flow chart of an exemplary handover process.

FIG. 5 illustrates a flow chart of an exemplary handover process 50. The handover process 50 is used for a UE of a wireless communication system, cooperating with the process 50 for handling handover message decoding to avoid errors in message decoding. The handover process 50 can be compiled into the program code 214 and includes the following steps:

Step 500: Start.
Step 502: Receive a handover message including type information and an inter-RAT message via the RAT of the serving network device.
Step 504: Determine a switched domain type of the inter-RAT message according to the type information.
Step 506: End.

According to the handover process 50, the UE receives the handover message via the RAT of the serving network device for performing the handover to the RAT of the target network. According to the type information of the handover message, the UE determines whether PS or CS switched domain type the inter-RAT message is. After the switched domain type is determined, the UE can utilize corresponding decoder (the PS-type decoder 216 or the CS-type decoder 218) to decode the inter-RAT message. Then the UE can perform the handover according to the decoded inter-RAT message.

Through the handover processes 40 and 50, the UE with the type information, is able to know the correct switched domain type of the inter-RAT message and thereby can accurately decode the inter-RAT message to handover to the determined switched domain type of the second RAT. Thus, decoding error and related handover failure can be avoided.

Take a handover from the UMTS to GSM system for example based on the concept of the processes 40 and 50. A UE in a UTRAN receives a HANDOVER FROM UTRAN COMMAND message including an inter-RAT message and a "Radio Bearer (RAB) information List" IE that is an example of the type information. The "RAB information List" IE is generated by the serving network based on what radio bearers of the UE need to be handed over. The "System type" IE in the HANDOVER FROM UTRAN COMMAND message indicates that the target system is "GSM" type. The UE can determine the switched domain type of the inter-RAT message according to the "RAB information List" IE.

When the "RAB information List" IE includes CS RAB(s) information only, the UE may determine that the inter-RAT message is the GSM RR (Radio Resource) control message. In this situation, the UE may further select a GSM RR control message decoder to decode the inter-RAT message. The GSM RR control message may be the HANDOVER COMMAND message. When the "RAB information List" IE includes PS RAB (s) information, irrespective of including CS RAB information or not, the UE may determine that the inter-RAT message is the GPRS RLC/MAC control message. In this situation, the UE selects a GPRS RLC/MAC control message decoder to decode the inter-RAT message. The abovementioned GPRS RLC/MAC control message may be the PS HANDOVER COMMAND message or the DTM HANDOVER COMMAND message.

Take another example. A UE only has one RAB established with the UTRAN and the RAB is a PS RAB. In other words, the UE establishes no connection with the UTRAN but one PS connection. The UE then receives a HANDOVER FROM UTRAN COMMAND message including a "SR-VCC Info" IE for a handover from the UMTS to GSM system. According to the "Single Radio Voice Call Continuity (SR-VCC) Info" IE (type information), the UE determines that the inter-RAT message included in the HANDOVER FROM UTRAN COMMAND message is a GSM RR control message. This is because the "SR-VCC Info" IE associates with a CS-type handover and the connection that can be handover is only the PS connection that has been established before the handover. Furthermore, the UE may select the GSM RR control message decoder to decode the inter-RAT message.

Take another example. A UE has two or more PS RABs established with the UTRAN. In other words, the UE has more than one PS connection. The UE then receives a HANDOVER FROM UTRAN COMMAND message including the "SR-VCC Info" IE for a handover from the UMTS to GSM system. The "RAB information List" IE includes information about the PS RABs. The "SR-VCC info" IE allows the UE to transform one of the PS connections into CS connection by the handover. The rest of PS connections are still PS-to-PS connection transform. Thus, according to the "SR-VCC Info" IE and the "RAB information List" (both as type information), the UE determines that the inter-RAT message included in the HANDOVER FROM UTRAN COMMAND message is a GPRS RLC/MAC control message. The UE may further select the GPRS RLC/MAC control message decoder to decode the inter-RAT message.

Take another example. If the HANDOVER FROM UTRAN COMMAND includes a GERAN SI (GSM/EDEG Radio Access Network System Information) IE or a GERAN PSI (Packet System Information) IE, the UE determines that the inter-RAT message is a GPRS RLC/MAC control message. In other words, the GERAN SI/GERAN PSI IE appears to an example of the type information, including system information of the target GERAN for the UE to follow. The same situation applies to the MobilityFromEUTRACommand message.

Figure 6:
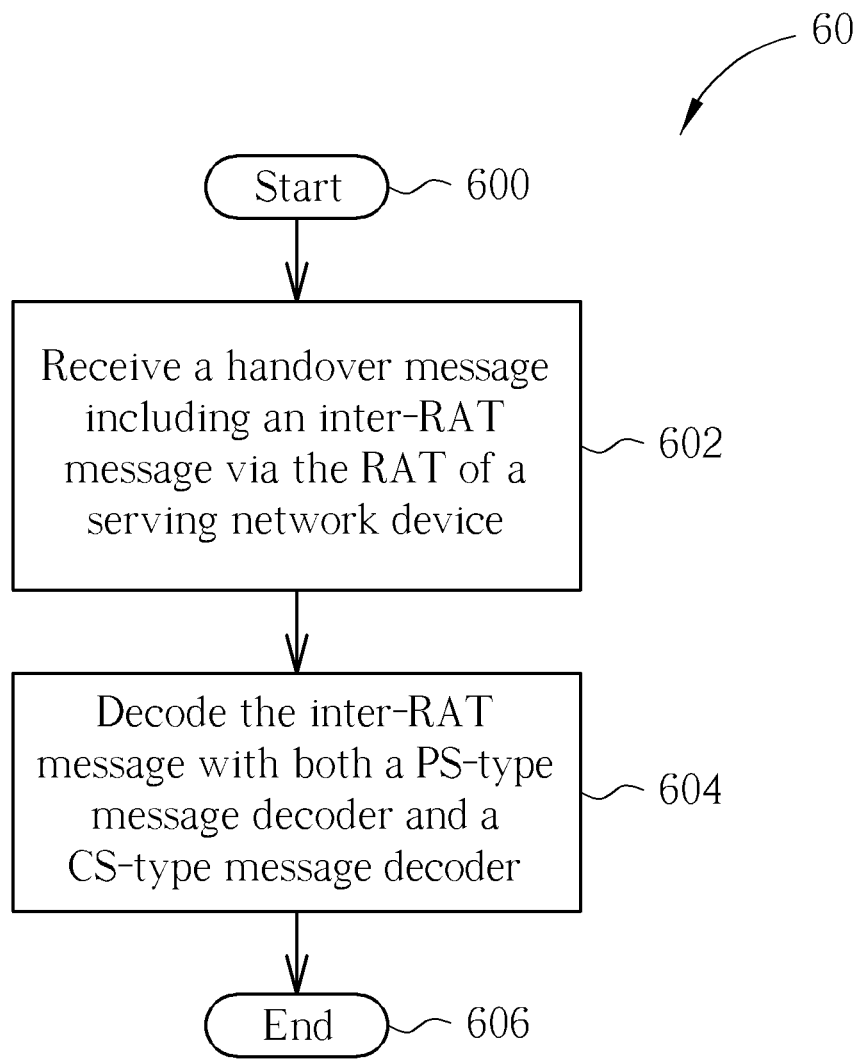
FIG. 6 is a flow chart of an exemplary handover process.

FIG. 6 illustrates a flow chart of an exemplary handover process 60. The handover process 60 is used for a UE of a wireless communication system, for handling handover message decoding. The handover process 60 can be compiled into the program code 214 and includes the following steps:

Step 600: Start.

Step 602: Receive a handover message including an inter-RAT message via the RAT of a serving network device.

Step 604: Decode the inter-RAT message with both a PS-type message decoder and a CS-type message decoder.

Step 606: End.

According to the handover process 60, the UE utilizes both the PS-type and CS-type message decoders to decode the inter-RAT message of the handover message received via the RAT of a serving network device. The UE then can determine which decoding result is correct and readable, according to a predetermined scheme of the inter-RAT message. The UE can check if the decoding results conform to field/IE distribution and related value ranges of the predetermined scheme. Further, the inter-RAT handover can be performed when the UE obtains a correct decoding result of the inter-RAT message.

The process 60 may be applied to the case of the handover message not including any type information.

For example, the UE decodes the inter-RAT message with the GSM RR control message decoder when the UE cannot decode the inter-RAT message successfully with the GPRS RLC/MAC control message decoder. Or the UE decodes the inter-RAT message with the GPRS RLC/MAC control message decoder when the UE cannot decode the inter-RAT message successfully with the GSM RR control message decoder. In addition, the UE determines that the decoding error occurs, only when the UE cannot decode the inter-RAT message successfully with any of the GSM RR control message decoder and GPRS RLC/MAC control message decoder. When successful decoding of the inter-RAT message is made, the UE performs the inter-RAT handover based on the decoding result.

Figure 7:
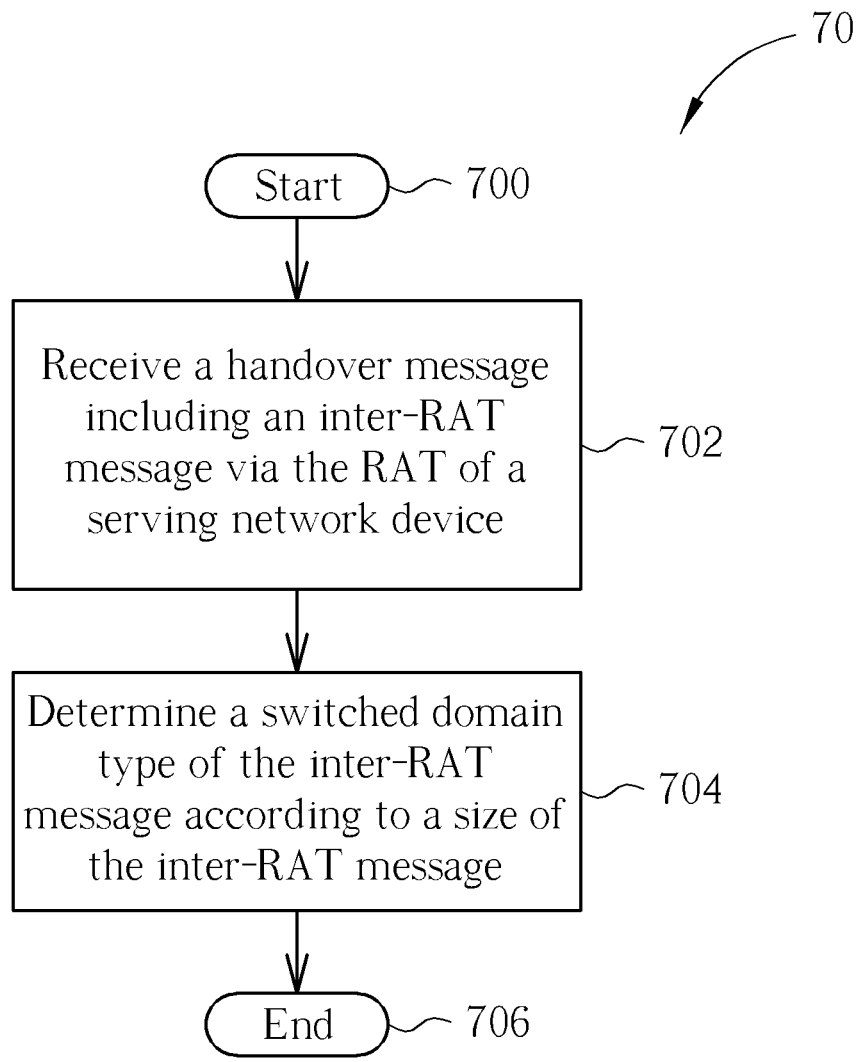
FIG. 7 is a flow chart of an exemplary handover process.

FIG. 7 illustrates a flow chart of an exemplary handover process 70. The handover process 70 is used for a UE of a wireless communication system, for handling handover message decoding. The handover process 70 can be compiled into the program code 214 and includes the following steps:

Step 700: Start.

Step 702: Receive a handover message including an inter-RAT message via the RAT of a serving network device.

Step 704: Determine a switched domain type of the inter-RAT message according to a size of the inter-RAT message.

Step 706: End.

According to the handover process 70, the UE determines the switched domain type of the inter-RAT message according to the size of the inter-RAT message. If each inter-RAT message (e.g. the HANDOVER COMMAND, PS HANDOVER COMMAND or DTM HANDOVER COMMAND message) has a size known by both the UE and the target network device, the target network device can generate the inter-RAT message conforming to the size, and the UE is able to know what the inter-RAT is and which switched domain type the inter-RAT is based on the default size. Alternatively, the inter-RAT message may be developed within a size range known by both the UE and the target network device. In this situation, the UE determines that the inter-RAT message is a CS-type message when the size of the received inter-RAT message is within the size range, and then uses the CS-type message decoder to perform inter-RAT message decoding. The process 70 may also be applied to the case of the handover message not including any type information.

For example, a UE in UTRAN receives a HANDOVER FROM UTRAN COMMAND message including an inter-RAT message and the target system type is "GSM". When the size of the inter-RAT message is within a size range, the UE determines that the inter-RAT message in the HANDOVER FROM UTRAN COMMAND message is a GSM HANDOVER COMMAND message. The UE then decodes the inter-RAT message with the GSM RR control message decoder and perform the handover according to the decoding result. If the size of the inter-RAT message is not within the size range, the UE determines that the inter-RAT message is a GPRS RLC/MAC control message. In this situation, the UE decodes the inter-RAT message with the GPRS RLC/MAC control message decoder.

Please note that the steps of the abovementioned processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the examples as mentioned above facilitate the UE to accurately handle decoding of the inter-RAT message by determining the switched domain type of the inter-RAT message or corresponding the usage of decoders in order to avoid decoding errors or following handover failure if a wrong decoding result is adopted.

Those skilled in the art will readily observe that numerous modifications and alterations of the device and method may be made while retaining the teachings and spirit and scope of the disclosure. Accordingly, the above disclosure should be construed as limited only by the metes and bounds of the appended claims.

What is claimed is:

1. A method of handling handover message decoding for a mobile device in a wireless communication system, the method comprising: via a first radio access technology (RAT), receiving a handover message associated with a handover from the first RAT to a second RAT supporting services of a packet switched (PS) domain and a circuit switched (CS) domain, wherein the handover message comprises type information and an inter-RAT message generated based on the second RAT;
determining a switched domain type of the inter-RAT message according to the type information, wherein the inter-RAT message is determined to be a PS-type message when the type information includes PS (Radio Bearer) RAB information, irrespective of including CS RAB information or not;
decoding the inter-RAT message according to the determination result;
performing the handover according to the decoded inter-RAT message;
utilizing a CS-type message decoder to decode the inter-RAT message when the inter-RAT message is determined to be a CS-type message; and utilizing a PS-type message decoder to decode the inter-RAT message when the inter-RAT message is determined to be a PS-type message.

2. The method of claim 1, wherein determining the switched domain type of the inter-RAT message according to the type information comprises:
determining that the inter-RAT message is a CS-type radio resource (RR) message when the handover message is a HANDOVER FROM UTRAN COMMAND message, the second RAT is a Global System for Mobile communications (GSM) RAT and the type information is a "radio bearer (RAB) information list" information element listing at least a CS RAB; and
determining that the inter-RAT message is a PS-type RR message when the handover message is the HANDOVER FROM UTRAN COMMAND message, the second RAT is the GSM RAT and the type information is a "RAB information list" IE listing at least a PS RAB.

3. The method of claim 1, wherein determining the switched domain type of the inter-RAT message according to the type information comprises:
determining that the inter-RAT message is a CS-type RR message when the handover message is a HANDOVER FROM UTRAN COMMAND message, the second RAT is a GSM RAT, the type information is a "Single Radio Voice Call Continuity (SR-VCC) Info" IE and the handover associates with one RAB that is a PS-type RAB; and
determining that the inter-RAT message is a PS-type RR message when the handover message is the HANDOVER FROM UTRAN COMMAND message, the second RAT is the GSM RAT, the type information is the "SR-VCC Info" IE and the handover associates with at least two PS-type RABs.

4. The method of claim 1, wherein determining the switched domain type of the inter-RAT message according to the type information comprises:
determining that the inter-RAT message is a PS-type RR message when the handover message is a HANDOVER FROM UTRAN COMMAND message or a MobilityFromEUTRACommand message and the type information is a GSM/EDEG Radio Access Network System Information (GERAN SI) IE or a GERAN Packet System Information (GERAN PSI) IE.

5. A mobile device of a wireless communication system for handling handover message decoding, the mobile device comprising:
means for via a first radio access technology (RAT), receiving a handover message associated with a handover from the first RAT to a second RAT supporting services of a packet switched (PS) domain and a circuit switched (CS) domain, wherein the handover message comprises type information and an inter-RAT message generated based on the second RAT;
means for determining a switched domain type of the inter-RAT message according to the type information, wherein the inter-RAT message is determined to be a PS-type message when the type information includes PS RAB information, irrespective of including CS RAB information or not;
means for decoding the inter-RAT message according to the determination result;
means for performing the handover according to the decoded inter-RAT message;
means for utilizing a CS-type message decoder to decode the inter-RAT message when the inter-RAT message is determined to be a CS-type message; and
means for utilizing a PS-type message decoder to decode the inter-RAT message when the inter-RAT message is determined to be a PS-type message.

6. The mobile device of claim 5, wherein the means for determining the switched domain type of the inter-RAT message according to the type information comprises:
means for determining that the inter-RAT message is a CS-type radio resource (RR) message when the handover message is a HANDOVER FROM UTRAN COMMAND message, the second RAT is a Global System for Mobile communications (GSM) RAT and the type information is a "radio bearer (RAB) information list" information element listing at least a CS RAB; and
means for determining that the inter-RAT message is a PS-type RR message when the handover message is the HANDOVER FROM UTRAN COMMAND message, the second RAT is the GSM RAT and the type information is a "RAB information list" IE listing at least a PS RAB.

7. The mobile device of claim 5, wherein the means for determining the switched domain type of the inter-RAT message according to the type information comprises:
means for determining that the inter-RAT message is a CS-type RR message when the handover message is a HANDOVER FROM UTRAN COMMAND message, the second RAT is a GSM RAT, the type information is a "Single Radio Voice Call Continuity (SR-VCC) Info" IE and the handover associates with one RAB that is a PS-type RAB; and means for determining that the inter-RAT message is a PS-type RR message when the handover message is the HANDOVER FROM UTRAN COMMAND message, the second RAT is the GSM RAT, the type information is the "SR-VCC Info" IE and the handover associates with at least two PS-type RABs.

8. The mobile device of claim 5, wherein the means for determining the switched domain type of the inter-RAT message according to the type information determines that the inter-RAT message is a PS-type RR message when the handover message is a HANDOVER FROM UTRAN COMMAND message or a MobilityFromEUTRACommand message and the type information is a GSM/EDEG Radio Access Network System Information (GERAN SI) IE or a GERAN Packet System Information (GERAN PSI) IE.

* * * * *